(12) United States Patent
Isbister et al.

(10) Patent No.: US 9,147,059 B2
(45) Date of Patent: Sep. 29, 2015

(54) BIOMETRIC-RICH GESTURES FOR AUTHENTICATION ON MULTI-TOUCH DEVICES

(71) Applicants: Katherine Isbister, Brooklyn, NY (US); Nasir Memon, Brooklyn, NY (US); Napa Sae-Bae, Brooklyn, NY (US)

(72) Inventors: Katherine Isbister, Brooklyn, NY (US); Nasir Memon, Brooklyn, NY (US); Napa Sae-Bae, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 394 days.

(21) Appl. No.: 13/739,906

(22) Filed: Jan. 11, 2013

(65) Prior Publication Data

US 2013/0219490 A1      Aug. 22, 2013

Related U.S. Application Data

(60) Provisional application No. 61/601,825, filed on Feb. 22, 2012.

(51) Int. Cl.
G06K 9/00     (2006.01)
G06F 21/32    (2013.01)

(52) U.S. Cl.
CPC ............ *G06F 21/32* (2013.01); *G06K 9/00355* (2013.01)

(58) Field of Classification Search
CPC ........................... G06F 21/32; G06K 9/00355
See application file for complete search history.

(56) References Cited

U.S. PATENT DOCUMENTS

| | | | |
|---|---|---|---|
| 8,539,550 B1* | 9/2013 | Terres et al. ...................... 726/2 |
| 8,614,664 B2* | 12/2013 | Yasutake ...................... 345/156 |
| 8,638,939 B1* | 1/2014 | Casey et al. .................. 380/277 |
| 8,941,466 B2* | 1/2015 | Bayram et al. ............... 340/5.82 |
| 2009/0051659 A1* | 2/2009 | Mickelborough ............ 345/173 |
| 2011/0156867 A1* | 6/2011 | Carrizo et al. ............... 340/5.85 |
| 2012/0223895 A1* | 9/2012 | Lu et al. ......................... 345/173 |
| 2013/0219490 A1* | 8/2013 | Isbister et al. .................. 726/19 |
| 2014/0267044 A1* | 9/2014 | Andersen ...................... 345/168 |

* cited by examiner

*Primary Examiner* — Gregory M Desire
(74) *Attorney, Agent, or Firm* — John C. Pokotylo; Straub & Pokotylo

(57) ABSTRACT

The problem of obtaining a multi-touch input sequence for use in user authentication is solved by determining, at a plurality of time instances, a mapping from an unordered set of at least four touch points to a an ordered set of at least four fingertips, wherein for at least one of the plurality of time instances, the mapping from the unordered set of at least four touch points to the ordered set of at least four fingertips is subject to a constraint that the ordered set of at least four touch points defines a simple polygon.

18 Claims, 9 Drawing Sheets

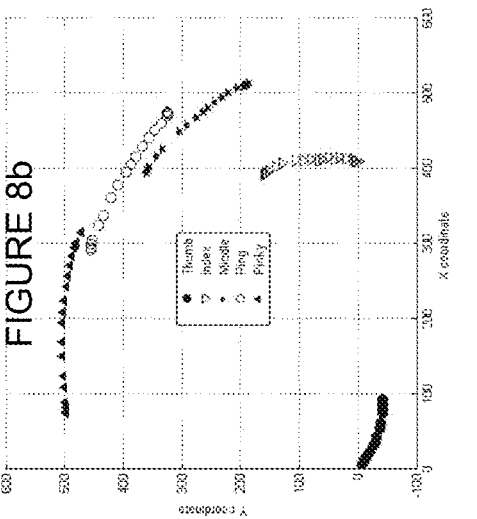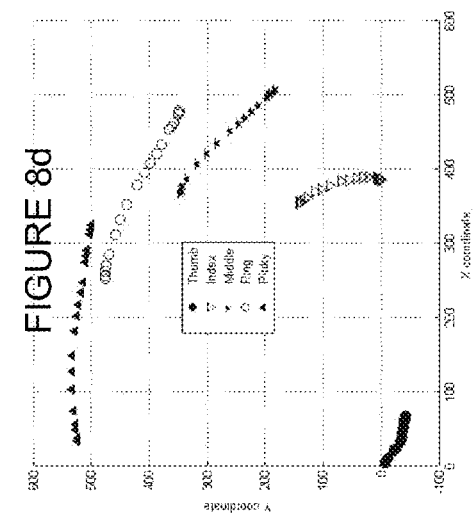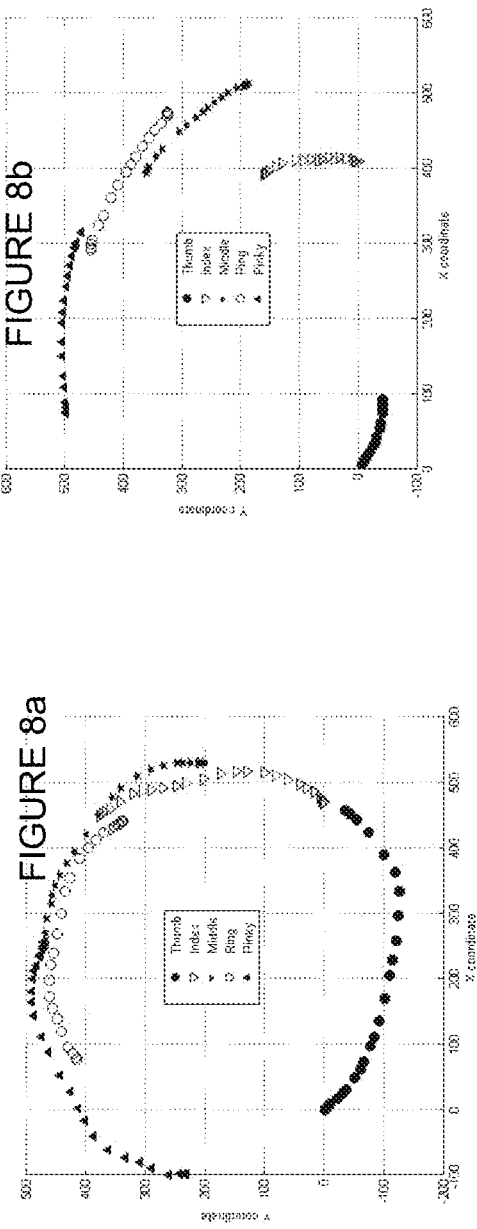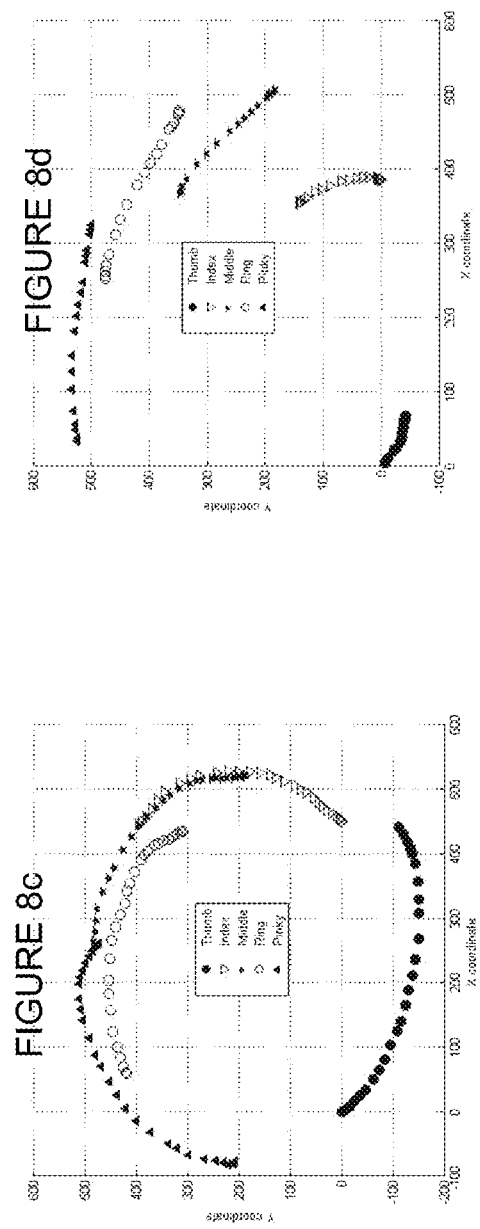

ated using Pattern Lock generally have low entropy. (See, e.g. http://beust.com/weblog2/archives/000497.html, incorporated herein by reference.) Second, a pattern sketched by a user's finger in Pattern Lock has been shown to be vulnerable to disclosure based on the traces left on the touch screen by finger oils. (See, e.g., http://techcrunch.com/2008/10/12/androids-login-is-cool-but-is-it-secure/, incorporated herein by reference.) Third, Pattern Lock does not protect against so-called "shoulder surfing" attacks since these pattern-based passwords generally do not contain biometric information specific to the authorized user. (See, e.g., [Kim, D., Dunphy, P., Briggs, P., Hook, J., Nicholson, J., Nicholson, J., and Olivier, P., "Multi-touch Authentication on Tabletops," *Proceedings of the* 28*th International Conference on Human Factors in Computing Systems*, CHI '10, pp. 1093-1102 (ACM, New York, N.Y., USA, 2010), and Wiedenbeck, S., Waters, J., Birget, J.-C., Brodskiy, A., and Memon, N., "Passpoints: Design and Longitudinal Evaluation of a Graphical Password System," *International Journal of Human-Com-*

---

BIOMETRIC-RICH GESTURES FOR AUTHENTICATION ON MULTI-TOUCH DEVICES

§1. RELATED APPLICATIONS

This application claims the benefit of U.S. Provisional Patent Application Ser. No. 61/601,825 (incorporated herein by reference and referred to as "the '825 provisional"), filed on Feb. 22, 2012, titled "BIOMETRIC AUTHENTICATION USING MULTI-TOUCH GESTURES" and listing Katherine ISBISTER, Nasir MEMON and Napa SAE-BAE as the inventors. The present invention is not limited to requirements of the particular embodiments described in the '825 provisional application.

§2. BACKGROUND OF THE INVENTION

§1 Field of the Invention

The present invention concerns authenticating a user. More specifically, the present invention concerns authenticating a user using input from a multi-touch device.

§2 Background Information

With the growing popularity of mobile computing devices and their use for activities such as banking and other transactions that require security, protecting user credentials on mobile devices is becoming increasingly important.

Current applications typically maintain the privacy of users' sensitive data by authenticating a user each time they login. Most mobile devices today use traditional text-based password schemes to authenticate a user. Unfortunately however, users have been known to choose weak passwords. (See, e.g., Jain, A., Ross, A., and Pankanti, S., "Biometrics: A Tool for Information Security," *IEEE Transactions on Information Forensics and Security*, Vol. 1, pp. 125-143 (June 2006), incorporated herein by reference.) This is especially true with touch devices, which are extremely popular. One study has shown that the speed of typing on flash glass, which is used in touch devices, is 31% slower than typing on a physical keyboard. (See, e.g., Findlater, L., Wobbrock, J. O., and Wigdor, D., "Typing on Flat Glass: Examining Ten-Finger Expert Typing Patterns on Touch Surfaces," *Proceedings of the* 2011 *Annual Conference on Human Factors in Computing Systems*, CHI '11, ACM (New York, N.Y., USA, 2011), pp. 2453-2462, incorporated herein by reference.) Some believe that this has led to users using shorter passwords on touch devices to shorten their log-in time.

More generally, text passwords have been known to impose a cognitive burden on users that results in selection of weak passwords. (See, e.g., Wiedenbeck, S., Waters, J., Birget, J.-C., Brodskiy, A., and Memon, N., "Passpoints: Design and Longitudinal Evaluation of a Graphical Password System," *International Journal of Human-Computer Studies*, No. 1-2, pp. 102-127 (2005), and Denning, T., Bowers, K., van Dijk, M., and Juels, A., "Exploring Implicit Memory for Painless Password Recovery," *Proceedings of the* 2011 *Annual Conference on Human Factors in Computing Systems*, CHI '11, ACM (New York, N.Y., USA, 2011), pp. 2615-2618, both incorporated herein by reference.) To tackle this problem, in 1996, Blonder first proposed graphical passwords based on a memory study (See Calkins, M. W., "Short Studies in Memory and in Association from the Wellesly College Psychological Laboratory" *Psychological Review*, Vol. 5(5), pp. 2453-2462 (ACM, New York, N.Y., USA, September 1998), incorporated herein by reference.) that showed human memory for visual words is stronger than for pronounced words. Blonder's graphical passwords were later improved by Passpoints (See, e.g., Wiedenbeck, S., Waters, J., Birget, J.-C., Brodskiy, A., and Memon, N., "Passpoints: Design and Longitudinal Evaluation of a Graphical Password System," *International Journal of Human-Computer Studies*, No. 1-2, pp. 102-127 (2005).) and Cue Click Points (See, e.g., Chiasson, S., van Oorschot, P., and Biddle, R., "Graphical Password Authentication Using Cued Click Points," *Computer Security ESORICS* 2007, Vol. 4734 of Lecture Notes in Computer Science, Springer Berlin/Heidelberg (2007), incorporated herein by reference.). Passfaces is another example of a visual memory based authentication scheme where users are asked to repeatedly pick faces out of those presented. (See, e.g., http://www.passfaces.com/pfphelp/logon.htm, incorporated herein by reference.) Draw-a-Secret is a graphical password that is a simple secret picture drawn on a grid. (See, e.g., Dunphy, P., and Yan, J., "Do Background Images improve 'Draw a Secret' Graphical Passwords?," *Proceedings of the* 14*th ACM Conference on Computer and Communications Security*, CCS '07, pp. 36-47 (ACM, New York, N.Y., USA, 2007), incorporated herein by reference.) In 2010, a touch-screen authentication scheme, similar to Passpoints, which required users to sequentially tap on pre-selected images to input their password was proposed. (See, e.g., Jonathan Citty, D. R. H., "Tapi: Touch-Screen Authentication Using Partitioned Images," *ELON UNIVERSITY TECHNICAL REPORT* 2010-1, pp. 1-6 (2010), incorporated herein by reference.)

Unfortunately however, the foregoing graphical password schemes are susceptible to a "shoulder surfing attack" (where an unauthorized user observes entry of the pattern by the authorized user), since they can be potentially observed by an attacker. (See, e.g., Kim, D., Dunphy, P., Briggs, P., Hook, J., Nicholson, J., Nicholson, J., and Olivier, P., "Multi-touch Authentication on Tabletops," *Proceedings of the* 28*th International Conference on Human Factors in Computing Systems*, CHI '10, ACM, pp. 1093-1102 (New York, N.Y., USA, 2010), incorporated herein by reference.)

Touch and multi-touch technologies enable new authentication techniques other than text passwords. One example is the touch-based password scheme called "Pattern Lock" implemented in the Android OS. (See, e.g., Shabtai, A., Fledel, Y., Kanonov, U., Elovici, Y., Dolev, S., and Glezer, C., "Google Android: A Comprehensive Security Assessment," *IEEE Security Privacy*, No. 2 in 8, pp. 35-44 (March-April 2010), incorporated herein by reference.) With Pattern Lock, the password is a pattern or sequence of dots connected by lines drawn by a user to gain access to the system. However, Pattern Lock has some disadvantages. First, passwords creputer Studies, No. 1-2, pp. 102-127 (2005), both incorporated herein by reference.) Finally, Pattern Lock does not exploit the full capabilities of the newer multi-touch interfaces emerging in tablets and touch pads where a user can use multiple fingertips to interact with the device. (See, e.g., Wang, F., and Ren, X., "Empirical Evaluation for Finger Input Properties in Multi-Touch Interaction," *Proceedings of the 27th International Conference on Human Factors in Computing Systems*, CHI '09, pp. 1063-1072 (ACM, New York, N.Y., USA, 2009), incorporated herein by reference.)

Many alternative approaches have been proposed to tackle the problem of shoulder surfing attacks. For example, in 2004, a PIN-based challenge-response approach was proposed. (See, e.g., Roth, V., Richter, K., and Freidinger, R., "A Pin-Entry Method Resilient Against Shoulder Surfing," *Proceedings of the 11th ACM Conference on Computer and Communications Security*, CCS '04, pp. 236-245 (ACM, New York, N.Y., USA, 2004), incorporated herein by reference.) Under this example approach, to enter one digit, the user repeatedly chooses the color of the focus digit shown on the screen (either black or white). In another example, a graphical challenge response scheme was proposed. (See, e.g., Wiedenbeck, S., Waters, J., Sobrado, L., and Birget, J.-C., "Design and Evaluation of a Shoulder-Surfing Resistant Graphical Password Scheme," *Proceedings of the Working Conference on Advanced Visual Interfaces*, AVI '06, pp. 177-184 (ACM, New York, N.Y., USA, 2006), incorporated herein by reference.) In this other example, given a convex hull generated by the preselected icons, the user clicks on any icon that appears inside that convex hull and the process is repeated multiple times. Recently, a pressure-based authentication scheme was proposed to reduce the visibility of the secret to an attacker. (See, e.g., Kim, D., Dunphy, P., Briggs, P., Hook, J., Nicholson, J., Nicholson, J., and Olivier, P., "Multi-Touch Authentication on Tabletops," *Proceedings of the 28th International Conference on Human Factors in Computing Systems*, CHI '10, pp. 1093-1102 (ACM, New York, N.Y., USA, 2010), incorporated herein by reference.) The idea behind this pressure-based authentication scheme is to confuse or "blind" an attacker by placing fingertips simultaneously in different zones. The user then communicates with the device by increasing the pressure on the fingertip located in a specific zone to select an object.

Yet, another approach to counter shoulder surfing is to avoid relying completely on a shared secret (i.e., a knowledge-based scheme or "what you know" scheme). In addition, a behavior component ("what you are") is used to supplement the shared secret. One way to achieve this is by using biometric technology. In a biometric authentication system, a personal trait is used to verify (or help verify) a user. To increase the level of security, biometrics can be combined with any other authentication scheme to get a multi-factor authentication. Biometric traits that have been studied for authentication include physiological ones such as retina, iris, fingerprint, face, vein and palm, and behavioral ones such as dynamic signatures, voice, keystroke, and gait. However, using such biometric traits may have drawbacks. More specifically, some require special hardware, some are not robust to external environment changes, some are prone to high error rates and some need long training sessions. Also physiological traits are intrusive from a privacy point of view and they may be impossible to change. For example, a user may be uncomfortable giving an iris scan to Amazon.com because once they do, they cannot change it.

Multi-touch user authentication is also described in U.S. Patent Application Publication No. 2010-0225443 (referred to as "the '443 publication" and incorporated herein by reference). Some example authentication methods described in the '443 publication involve multi-touch gestures. Such techniques could be improved if a reliable and efficient method for maintaining a set of ordered fingertip touches is used.

Given the increasing prevalence of devices including multi-touch technology, it would be useful to provide a new user authentication system that does not have the limitations of text passwords and Pattern Lock-like mechanisms as described above. Further, if a multi-touch authentication system is to be used, such a multi-touch authentication system should ideally be secure (e.g. providing a sufficiently large entropy, less susceptible to shoulder surfing, etc.), yet enjoyable (or at least easy to use) for the end user. It would be useful if such a multi-touch authentication system captured biometric traits (e.g., derived from hand geometry and/or hand movement) of the user. Finally, if a multi-touch authentication system is to be used, it would be useful to use a reliable and efficient method for maintaining a set of ordered fingertip touches.

§3. SUMMARY OF THE INVENTION

The problem of authenticating a user via a multi-touch input device is solved by (1) obtaining a template of the user's multi-touch input sequence during an enrollment stage, wherein the act of obtaining a template includes determining, at a plurality of time instances, a mapping from an unordered set of at least four touch points to a an ordered set of at least four fingertips and wherein for at least one of the plurality of time instances, the mapping from the unordered set of at least four touch points to the ordered set of at least four fingertips is subject to a constraint that the ordered set of at least four touch points defines a simple polygon (2) storing the obtained template, (3) receiving a verification multi-touch input sequence, (4) comparing the received verification multi-touch input sequence with the stored template, and (5) permitting or denying access to a device, service, or information based on a result of the comparison.

The problem of obtaining a multi-touch input sequence for use in user authentication is solved by determining, at a plurality of time instances, a mapping from an unordered set of at least four touch points to a an ordered set of at least four fingertips, wherein for at least one of the plurality of time instances, the mapping from the unordered set of at least four touch points to the ordered set of at least four fingertips is subject to a constraint that the ordered set of at least four touch points defines a simple polygon.

At least some example embodiments consistent with the present invention use a touch screen as a biometric sensor to capture user traits.

At least some example embodiments consistent with the present invention are based on multi-touch gestures and can be seen as an instance of a behavioral-biometric-based authentication technique.

§4. BRIEF DESCRIPTION OF THE DRAWINGS

FIGS. 8a-8d illustrate examples of different instances of the same gesture from different users.

§5. DETAILED DESCRIPTION

The present invention may involve novel methods, apparatus, message formats, and/or data structures for authenticating users using multi-touch gestures. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§5.1 Defining a Set of Gestural Possibilities

Figure 1:
FIG. 1 illustrates an example of a multi-touch gesture with sufficient biometric characteristics to allow for authentication.

FIG. 1 is an example of a multi-touch gesture in which the user performs the gesture with all five fingers at once, and in which biometrics are drawn from the hand's geometry as well as the dynamics of the gesture itself.

Proprietary and open source gesture libraries exist, and are used multi-touch developers. These include, for example, the iPhone 3G multi-touch gesture dictionary (See, e.g., *Apple. Multi-Touch Gesture Dictionary*, incorporated herein by reference.) and the Gesture Works open source gesture library (See, e.g., http://gestureworks.com/features/open-source-gestures/, incorporated herein by reference.). However, these frameworks are intended for control input, not to serve as biometric keys for authentication. This is because most of the gestures in these libraries use only two fingers. However, for purposes of authentication, the present inventors believe that gestures using at least four fingers, and preferably all five fingers, are the most useful for purposes of authentication since such gestures obtain more data from the hand geometry and muscle behavior of an individual. This led the present inventors to create their own gestural taxonomy based upon movement of the two major components of the hand; the palm and the fingertips. Palm movement is discussed in section 5.1.1, while fingertip movement is discussed in section 5.1.2.

§5.1.1 Palm Movement

Palm movement occurs when the hand itself needs to move during a gesture, as opposed to gestures just requiring movement of the finger tips. Some gestures place the users' palm in one static position for the entire gesture, whereas other gestures require the palm to traverse the touch surface, or rotate on the touch surface while executing the gesture. Thus, the taxonomy used herein divides gestures into two classes for palm movement; those gestures with static palm position and those with dynamic palm position.

With static palm position gestures, the palm position remains static while performing the gesture. In other words, only the fingertips move; the position of the palm does not change. Examples of static palm position gestures include pinch and zoom gestures. With dynamic palm position gestures, the center of the hand moves while performing the gesture. Examples of dynamic palm position gestures include drag and swipe gestures.

§5.1.2 Fingertip Movement

Most of the distinguishing features of a multi-touch gesture come from movement of the fingertips. The taxonomy used herein divides fingertip movement into four categories; parallel, closed, opened and circular.

With parallel fingertip gestures, all fingertips move in the same direction during the gesture. An example of a parallel fingertip gesture is a five-finger swipe, in which all five fingers move from left to right on the screen. With closed fingertip gestures, all fingertips move inward toward the center of the hand during the gesture. An example of a closed fingertip gesture is a pinch gesture. With an opened fingertip gesture, all fingertips move outward from the center of the hand during the gesture. An example of an opened fingertip gesture is a reverse pinch gesture. Finally, with a circular fingertip gesture, all fingertips (or most fingertips, as described with respect to partial fingertip gestures below) rotate around the center of the hand during the gesture. An example of a circular fingertip gesture is a clockwise or counterclockwise rotation.

§5.1.2.1 Further Fingertip Dynamics

In some gestures, the fingertips do not move all at once during the gesture. For example, there may be one or more fingertips resting in a fixed position on the screen while other fingertips move. This can help to stabilize the gesture for the user. Consequently, the gesture classification taxonomy used herein further divides fingertip gestures into two additional classes; full fingertip and partial fingertip. With full fingertip gestures, all fingertips move during the gesture. On the other hand, with partial fingertip gestures, some fingertips move during the gesture, but others rest in a static position on the screen during the gesture.

§5.1.3 Defined Gestures

These foregoing gesture classifications (based on palm movement, fingertip movement and further fingertip dynamics) are used to define a canonical set of authentication gestures. Below is a list of 22 gestures that were studied by the present inventors. The indicated abbreviations are used throughout the specification.

Figure 2B:
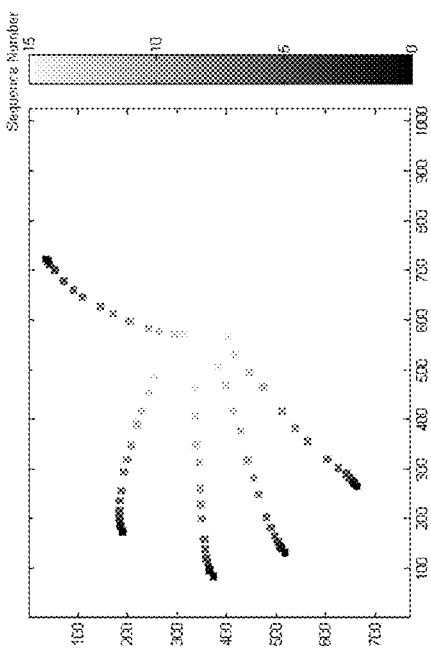
FIGS. 2a-2d illustrate examples of the gestures categorized by different movement characteristics.

Close: All five fingers move toward the palm's center, in a closing motion. (See FIG. 2b.)

FTC (fixed thumb, close): Thumb is fixed, and the other fingers move toward the palm's center in a closing motion.

FPC (fixed pinky, close): Pinky is fixed, other fingers move toward the palm's center in a closing motion.

Open: All five fingers move away from palm's center, in an opening motion.

Figure 2D:
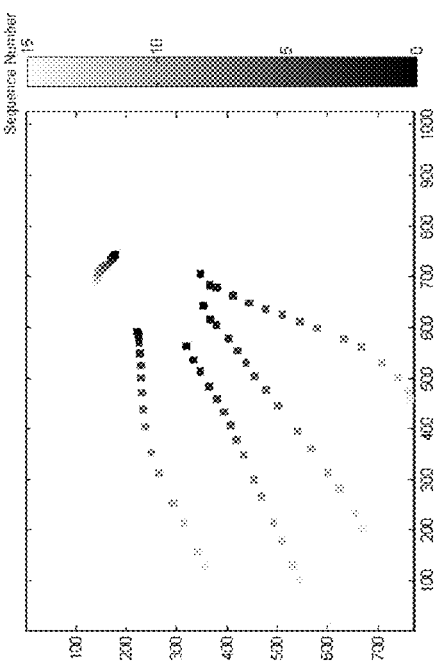

FTO (fixed thumb open): Thumb is fixed, and the other fingers move away from palm's center in an opening motion. (See FIG. 2d.)

FPO (fixed pinky open): Pinky is fixed, other fingers move away from palm's center in an opening motion.

CW: All fingertips rotate in a clockwise direction.

FTCW (fixed thumb CW): Thumb is fixed, other fingertips rotate around it in a clockwise direction.

Figure 2A:
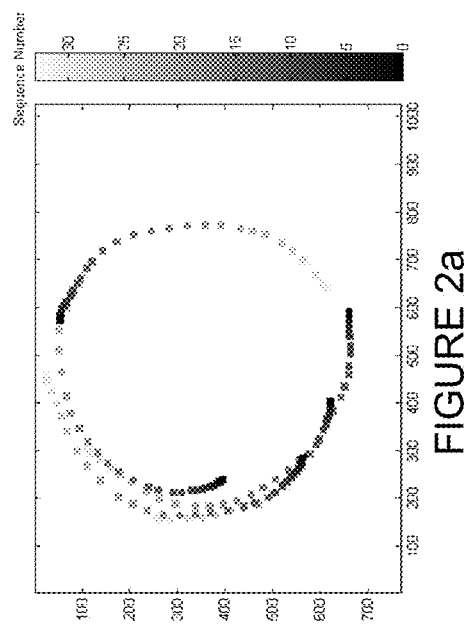

CCW: All fingertips rotate in a counter-clockwise direction. (See FIG. 2a.)

FTCCW (fixed thumb CCW): Thumb is fixed, other fingertips rotate around it in a counter-clockwise direction.

FPCCW (fixed pinky CCW): Pinky is fixed, other fingertips rotate around it in a counter-clockwise direction.

Drag: All fingers move in parallel from top to bottom of screen.

DDC (dynamic drag close): The dynamic (moving from top to bottom) gesture performing a closing motion with all fingertips.

FTP (fixed thumb parallel): Thumb is fixed, other fingertips move in parallel from top to bottom of screen.

FPP (fixed pinky parallel): Pinky is fixed, other fingertips move in parallel from top to bottom of screen.

FBD (fixed both drag): Pinky and thumb are both fixed; other fingertips move in parallel from top to bottom of screen.

Figure 2C:
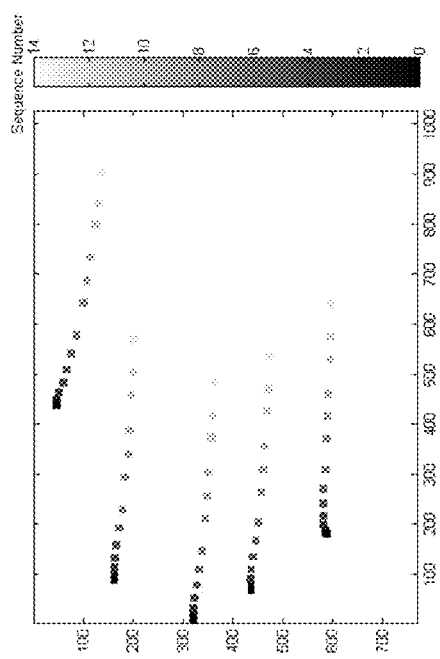

Swipe: All fingers move in parallel from left to right of screen. (See FIG. 2c.)

Flick: Quick top-left to bottom-right parallel movement of all fingertips.

FBSA (fixed both arrow-shape, version A): The static gesture performing parallel (>shape) with fixed thumb and pinky FBSB (fixed both arrow-shape, version B: The static gesture performing parallel (<shape) with fixed thumb and pinky User Defined: All five fingertips move as the person pretends to sign his/her signature on the screen.

DUO: The dynamic (moving from bottom to top) gesture performing a opening motion with all fingertips.

The foregoing gestures were studied to find those gestures that were the most robust in terms of biometrics, and also the most appealing to users.

§5.2 Developing a Gesture Authentication Technique

In an example biometric verification or authentication system, the identity of the user is given to the system along with a proof of identity (the biometric), or just the proof of identity. Whether or not the proof of identity is valid then determined by the system. Based on the outcome of this determination, the user is either accepted or rejected by the system.

In order to verify the proof of identity, the system needs to have a prior knowledge about it. To achieve this, there are generally two stages in a verification system: (1) an enrollment stage and (2) a verification stage. The purpose of the enrollment stage is to register the user's "proof of identity" data in the system by acquiring and storing a biometric "template" corresponding to the user. The template may (and should) include more than one input sample. That is, since biometric data is unlikely to be repeated exactly (for example two iris scans of the same user will never be the same due to acquisition noise and variation of environment in which they are acquired), one sample is not good enough to represent an individual's biometric. In the verification stage, the input biometric proof of identity instance is compared with the samples of the stored biometric template of the claimed identity in order to authenticate a user.

§5.2.1 Example Biometric Verification Algorithm

Figure 3:
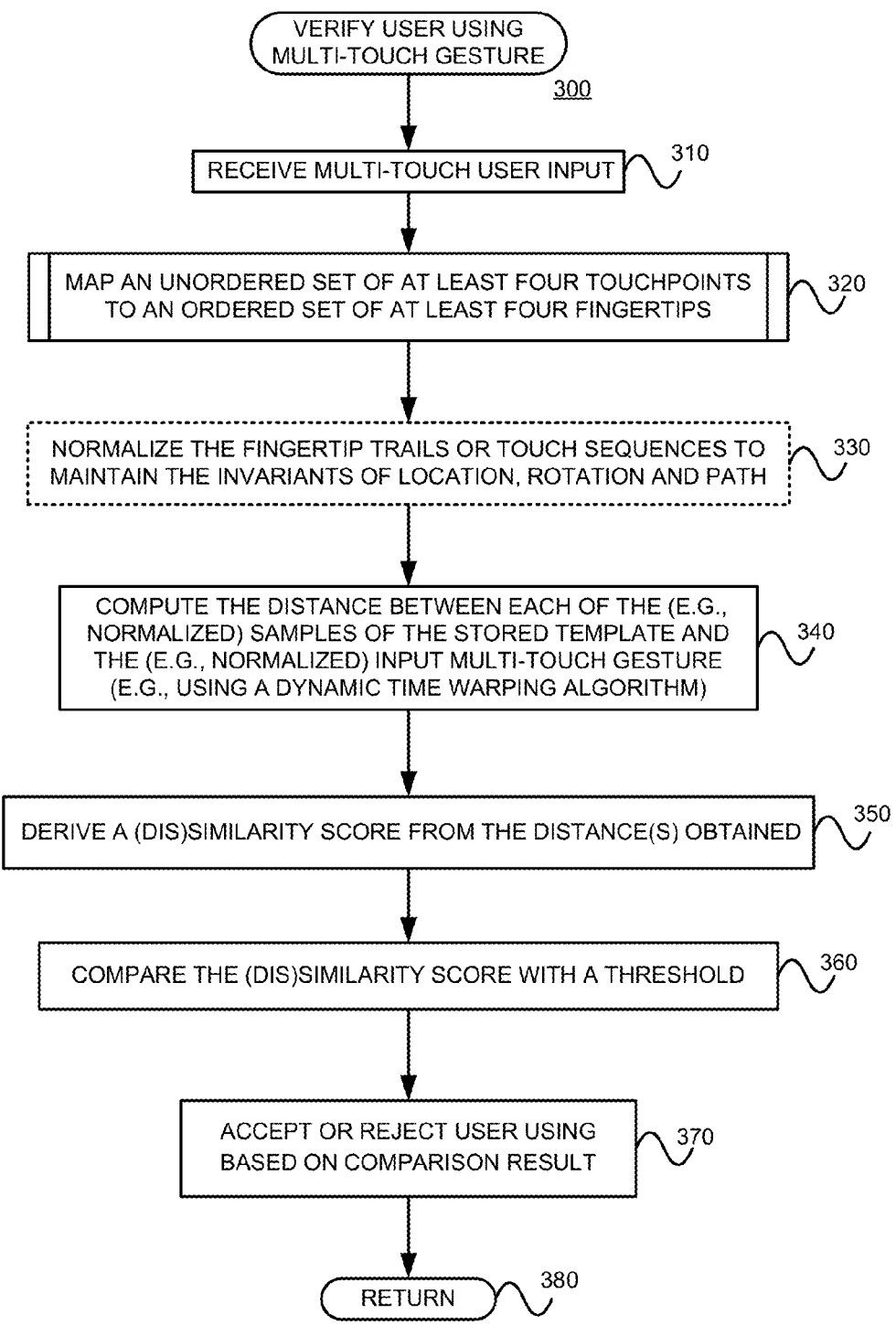
FIG. 3 is a flow diagram of an example method for authenticating a user using a multi-touch gesture.

An example biometric verification algorithm for multi-touch gestures, which was implemented and tested by the present inventors, is now described with respect to the flowchart of FIG. 3. The verification process begins with the user performing a multi-touch gesture. All x-y coordinates, timestamps and labels of the resulting five touch sequences from five fingertips are sequentially captured by the input device. This is received as multi-touch user input. (Block 310)

At this point, the given labels of touch points are not associated with the actual respective fingertips. In other words, the touch generated from the thumb can appear in any label—from 1 to 5. To verify the multi-touch gesture input by the user by comparing with (the samples of) the stored template of the user, all the touch points should be labeled and ordered in a consistent manner. Example embodiments to map an unordered set of at least four touch points to an ordered set of at least four fingertips (Block 320) are described later, in section 5.2.1.1. Then, as described in section 5.2.1.2, the fingertip trails or touch sequences may be normalized (Block 330) to make the template (samples) location invariant, rotation invariant and path invariant. However, as further explained, such normalization can be avoided in some example embodiments if distance-based features are used. Then, as described in section 5.2.1.3, a Dynamic Time Warping algorithm or some other algorithm is used to compute the distance between each of the (e.g., normalized) samples of the stored template and the (e.g., normalized) input multi-touch gesture. (Block 340) A dissimilarity (or similarity) score is derived from the distances obtained, as described in section 5.2.1.4. (Block 350) Finally, a user is accepted or rejected by comparing the dissimilarity (or similarity) score with a threshold (Blocks 360 and 370), before the method 300 is left (Node 380).

§5.2.1.1 Mapping Touch Sequences to Specific Fingers

To correctly compare any two multi-touch sequences (each touch sequence has 5 touch point trails), they should be stored in a consistent order. Hence the first step is to order (or re-order) the touch sequences in a consistent manner (e.g., into a canonical form). For example, a standard order employed may be to order the touches generated by Thumb, Index, Middle, Ring and Pinky, respectively, $1^{st}$ to $5^{th}$. To achieve this, touch points in a touch sequence must be mapped to the corresponding fingers. This is not trivial because the acquisition process may capture points in an arbitrary order depending on which fingertips made contact with the touch surface first. To correctly match touch sequences with fingers, example embodiments consistent with the present invention exploit natural characteristics of human hand geometry. More specifically, a simple polygon that connects the starting points of each touch sequence is first constructed. (See, e.g., FIG. 4.) Then, the thumb position is identified based on pairwise distances between polygon vertices. Finally, touch sequences corresponding to each of the remaining fingers are identified and labeled based on a circular order, starting from the thumb position.

More specifically, a multi-touch gesture is basically a time-series of the set of x-y coordinates of finger touch points. Each set consists of five touch points where each touch point is generated from one fingertip. However, without more, the system would not know which fingertip corresponds to which touch point. Indeed, the system may initially order them based on how users lay their fingertips down. The first finger of the user to touch the surface may vary from one instance to another for the same gesture. And this order may fluctuate from one set within the time series to another within the same gesture. As a result, a set of touch points initially ordered by the system based on the order in which the fingertips touch the multi-touch plane should not be directly compared with another. Hence, the first step is to map each of the touch points to the corresponding fingertip.

Specifically, for every touch point set $S_t=\{(x_i,y_i)|i=1,\ldots,5\}$ at time instance t, the system computes the unique bijective mapping from the set of five touch points to the set of fingertip labels $I=\{1,\ldots,5\}$. That is, we have to compute $f_t:S_t \to I$.

Figure 4:
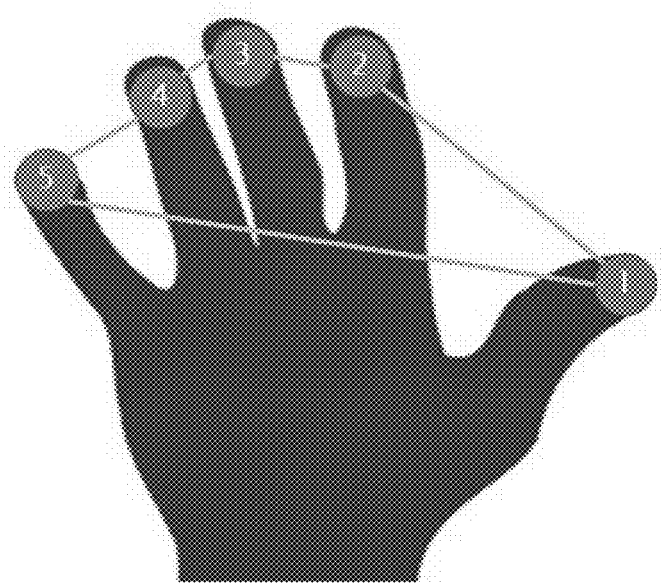
FIG. 4 illustrates using a polygon-based constraint for mapping an unordered set of touch points to an ordered set of fingertips.

Note that the closed path drawn from the five fingertip points in circular order is always a simple polygon for most gestures (such as the set of 22 gestures listed above), as shown in FIG. 4. Therefore, the system may compute the mapping $f_t$ at each time instance as follows. Starting with the first set, $S_0$, the x-y coordinates of the five points in this set are used to compute their "centroid." Then the points are sorted in ascending order by the angle they make with this centroid. Next, the thumb is identified by exploiting the property observed from typical hand geometry that the thumb is the furthest away from its immediate neighbors (in circular order) among all the fingers. Once the system indentifies the thumb, it may then find the index finger by following the x-y coordinates of the remaining points in a circular arc. Note that if the gesture is left handed, the detected order will be thumb, pinky, ring, middle, and Index fingers, respectively. However, this does not affect matching performance as the order is consistent within the particular user.

Once the system has computed $f_0$ (that is, once it has mapped the first set of points to the corresponding fingertips), the mapping for the subsequent remaining touch point sets can be modeled as an optimization problem where the possible mappings are constrained by the natural characteristic of hand geometry which dictates that when touch points corresponding to physically adjacent fingers are connected and the pinky is finally connected to the thumb, a simple polygon is obtained (for most gestures, including the 22 listed above). In other words, if the label assignment is valid, connecting the points in $S_t$ ordered by its label in circular order ($1 \to 2 \to 3 \to 4 \to 5 \to 1$) will form a simple polygon. Thus, as shown in the example method 500 of FIG. 5, at a plurality of time instances, a mapping from an unordered set of at least four touch points to an ordered set of at least four fingertips is determined, wherein for at least one of the plurality of time instances, the mapping from the unordered set of at least four touch points to the ordered set of at least four fingertips is subject to a constraint that the ordered set of at least four touch points defines a simple polygon (Block 510), before the method 500 is left (Node 520).

Figure 5:
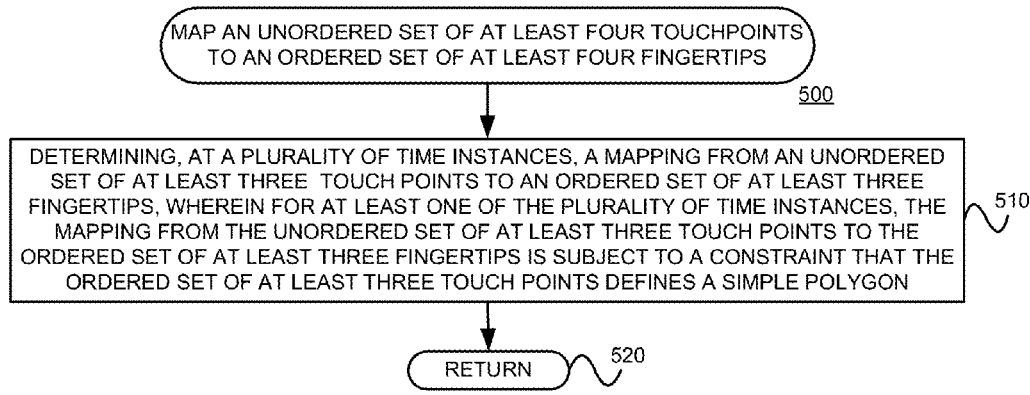
FIG. 5 is a flow diagram of an example method for mapping an unordered set of at least four touchpoints to an ordered set of at least four fingertips.
Figure 6:
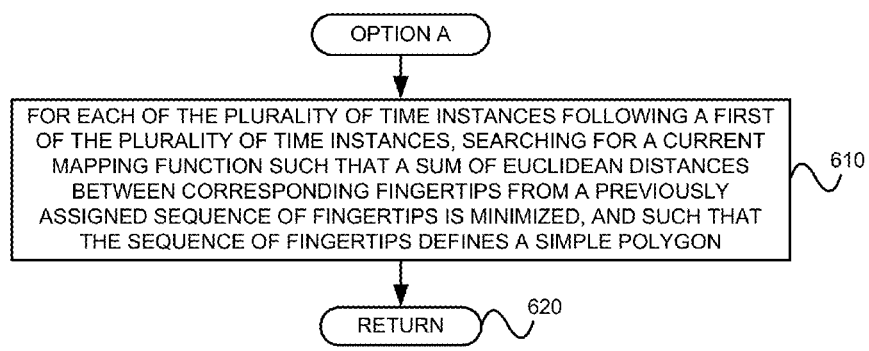
FIG. 6 is a flow diagram of a first example method used in the method of FIG. 5.

The determination at block 510 of FIG. 5 may be made in a number of different ways. FIG. 6 is a flow diagram of a method 600 of one way to make this determination. As shown in Block 610, for each of the plurality of time instances following a first of the plurality of time instances, the example method 600 searches for a current mapping function such that a sum of Euclidean distances between corresponding fingertips from a previously assigned sequence of fingertips is minimized, and such that the sequence of fingertips defines a simple polygon, before the method 600 is left (Node 620). More formally, given $f_{t-1}$, the objective function in the optimization is to search for the current mapping function $f_t$, such that the sum of the Euclidean distances between corresponding fingertips from the previous assigned sequence $f_{t-1}$ to f is minimized. That is, the system searches for, $$f_t = \operatorname*{argmin}_{f} \sum_{i \in I} \|f_{t-1}^{-1}(i) - f^{-1}(i)\|$$

such that $\{e_i, i=1, \ldots, 5\}$ constructs a simple polygon, where $e_i=(f^{-1}(i), f^{-1}(i+1))$ is the line segment drawn from the touch point corresponding to index i to the touch point corresponding to index i+1 of the mapping function $f:S_t \to I$. Note that process may start from the last touch point set of a time-series input if the last set creates a larger simple polygon than the first set (such as with the "open" gesture).

Figure 7:
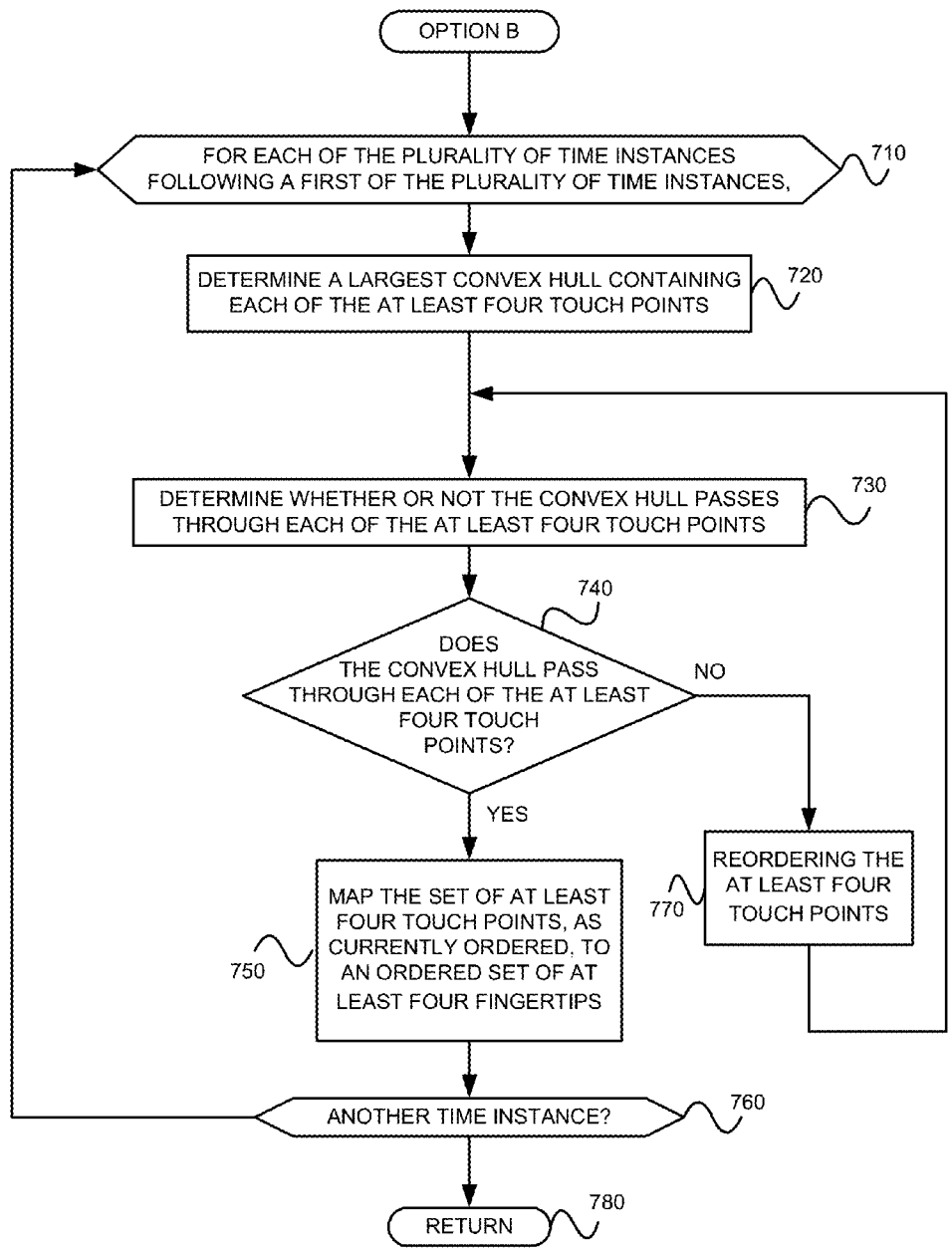
FIG. 7 is a flow diagram of a second example method used in the method of FIG. 5.

FIG. 7 is a flow diagram of a method 700 of another way to make the determination of block 510 of FIG. 5. In the example method 700, a number of acts are performed for each of the plurality of time instances following a first of the plurality of time instances. (See, loop 710-760.) More specifically, a largest convex hull containing each of the at least four touch points is determined. (Block 720) Then, it is determined whether or not the convex hull passes through each of the at least four touch points. (Block 730) Responsive to a determination that the convex hull passes through each of the at least four touch points, the method 700 maps the set of at least four touch points, as currently ordered, to an ordered set of at least four fingertips. (Decision block 740 and block 750) Otherwise, responsive to a determination at the convex hull does not pass through each of the at least four touch points, the at least four touch points are reordered and processing branches back to block 730. (Decision block 740 and block 770) One all time instances are processed (End of Loop 760), the method 700 is left (Node 780).

§5.2.1.2 Gesture Normalization

§5.2.1.2.1 Location And Orientation Invariance

The position of user touch sequences can be anywhere and in any orientation on the screen, and can differ from one instance to another. Hence, it may be desired to normalize location and orientation of the touch sequences before making comparisons. In our study, all the touch sequences were normalized based on the thumb and index's fingertips of the touch sequence generated when the five fingertips first contact the screen. All the gestures were normalized such that the thumb's tip in the first template is at the origin and the index finger's tip is at 0 degree of the plane. Examples of the same gesture from different users after location and orientation normalization are shown in FIGS. 8a-8d. (FIG. 8a is a first trial of a first user 1; FIG. 8b is a first trial of a third user 3; FIG. 8c is from a second trial of the first user; and FIG. 8d is from a fourth trail of the third user.) For the same user, the gestures are similar whereas they look different from the other users' gestures.

§5.2.1.2.2 Length Invariance

The actual (i.e., absolute) length of the fingertip trails can be different each time even when performed by the same user.

However, the relative length of each fingertip trail is another useful characteristic of the user's gesture. In other words, some users might perform the gesture in such a way that has an equal length for all the trails of the fingertips. Other users might perform the gesture in different ways. Hence the path length of the gestures may be normalized as follows before making comparisons between input and stored samples of a gesture template. Updated coordinates may be calculated as follows:

$$x'''(i, j) = \frac{x''(i, j) - \min_j(x''(1, 1))}{\max_j(x''(1, 1)) - \min_j(x''(1, 1))}$$

$$y'''(i, j) = \frac{y''(i, j) - \min_j(y''(1, 1))}{\max_j(y''(1, 1)) - \min_j(y''(1, 1))}$$

§5.2.1.2.3 Avoiding Normalization by Obtaining Rotation and Translation Invariant Features As noted above, according to differences in the hand's position and device's orientation within the same gesture, different trials from the same user may result in different 2-D patterns on the touch surface. Although normalization may be used to handle these variations, another example embodiment extracts higher order features by computing distances between pairs of the labeled points obtained after pre-processing. With different orientations and positions of the plane, the distance between any two points remains unchanged. By using distance-based features that are rotation and translation invariant. a separate step of normalization can be avoided.

To describe a polygonal curve $<p_1, p_2, \ldots, p_n>$ of a gesture input, which is a sequence of n touch point sets, the system may calculate a feature vector for each touch point set to describe a high dimensional point pi as follows.

For a "Euclidean distance feature," Let $S'_t = \{(x_i, y_i) | i = 1, \ldots, 5\}$ be a sorted set of touch points, each of the feature attributes $F_t(i, j)$ are calculated as follows:

$$F_t(i,j) = \sqrt{(x_i - x_j)^2 + (y_i - y_j)^2}$$

where i and j=1, . . . , 5. The number of distinct features for each touch point set in this case is $_5C^2$ or 10. Afterward, $F_t$ is linearized, using only the upper triangle of the matrix (since the matrix is symmetric with all 0's along the diagonal) to form a 10-dimensional point $p_i$.

With the simple Euclidean distance feature set above, the movement direction and distance between two consecutive sets is not captured. Consequently, it could result in lower system accuracy. Therefore, the system may derive additional features, referred to as "First order Euclidean distance features," as follows. Let $S_t^i = \{(x_i^t, y_i^t) | i=1, \ldots, 5\}$ and $S_{t+1}^i = \{(x_i^{t+1}, y_i^{t+1}) | i=1, \ldots, 5\}$ be two consecutive sorted sets of touch points. The additional feature attributes are calculated as follows:

$$F_t^i(i,k) = \sqrt{(x_i^t - x_{i+k}^{t+1})^2 + (y_i^t - y_{i+k}^{t+1})^2}, k=0,1$$

where i is the fingertip label in circular order ranging from 1 to 5. The number of distinct features for two consecutive sets is $_5C^2$ or 10. To form a point in 20-dimensional space, pi, the vector of 10 Euclidean distance from the first feature set is concatenated with $F'_t(i, 0)$ and $F'_t(i, 1)$.

§5.2.1.3 Dynamic Time Warping Algorithm and Other Matching Algorithms

The distance between two time-series signals with the different lengths is defined as the sum of the distances at the optimal non-linear path such that the distance or matching cost sum is minimized. Firstly, an input gesture is formatted as the time series of touch sequences; Gesture(t)=[Touch$_1$, Touch$_2$, . . . , Touch$_n$] where n is the number of the touches sequence of the gesture. Touch$_i$ is the vector of x-y coordinates of the touches in the $i^{th}$ sequence; Touch$_i$=[x$_1$, y$_1$, x$_2$, y$_2$, . . . , x$_5$, y$_5$]. Dynamic programming can be used to implement the optimal path searching algorithm. The Euclidean distance is calculated as a matching cost between two touch sequences. The sum of the Euclidean distances is then defined as the distance between two different gestures.

For example, taking a curve similarity approach, two different functions can be used to measure the distance between a pair of polygonal curves representing touch sequences which may have different lengths. Let $\pi = <p_1, p_2, \ldots, p_m>$ and let $\sigma = <q_1, q_2, \ldots, q_n>$ be two polygonal curves, $M = \{(p_i, q_i)\}$ be an order-preserving complete correspondence between $\pi$ and $\sigma$, and d(p, q) is a matching cost between p and q, the following distances may be defined as follows.

Referring to the reference B. Aronov, S. Har-Peled, C. Knauer, Y. Wang, and C. Wenk, "Frechet Distance for Curves, Revisited," *Proceedings of the 14th Conference on Annual European Symposium*, Vol. 14, pp. 52-63 (2006) (incorporated herein by reference), a discrete Frechet distance is defined as:

$$\delta_D(\pi, \sigma) = \min_M ( \max_{(p,q) \in M} d(p, q))$$

Dynamic time warping, which is a well-known matching algorithm to measure a similarity between two sequences which may vary in length, is defined as:

$$DTW(\pi, \sigma) = \frac{\min_M \sum_{\forall (p,q) \in M} d(p, q)}{\min(m, n)}$$

Different ways to measure distance may be used with Dynamic Time Warping (which "warps" the time of a temporal sequence of fingertouch samples such that distances between the two samples are minimized). Three alternative ways to measure distance—Manhattan distance, Euclidean distance and cosine distance—are described below. In each of the following, let p and q be two points in one-dimensional Euclidean space. Manhattan distance defined as:

$$d_M(p, q) = \sum_{i=1}^{l} |p_i - q_i|$$

Euclidean distance function is defined as:

$$d_E(p, q) = \sqrt{\sum_{i=1}^{l} (p_i - q_i)^2}$$

Finally, cosine distance is defined as:

$$d_C(p, q) = 1 - \frac{p \cdot q}{\|p\| \|q\|}$$

Other distance functions may be used.

§5.2.1.4 Dissimilarity Scoring and Thresholding

The decision of whether the biometric multi-touch is coming from the claimed user or not depends on the similarity of the input biometric multi-touch to the samples of the stored template. In other words, if the dissimilarity score of the input biometric compared to the samples of the stored template is lower than a threshold, the user is verified. Otherwise, the system will reject the user. To calculate the dissimilarity score between the registered user's template and the input, all distances between the incoming gesture and template are used to calculate a dissimilarity score along with the distances between all the samples of the stored template themselves. The idea is to normalize the inter-user variations with the intra-user variations and use as a dissimilarity score as suggested in Kholmatov, A., and Yanikoglu, B., "Biometric Authentication Using Online Signatures," *Proc. ISCIS, Springer LNCS*-3280, pp. 373-380 (Springer-Verlag 2004), incorporated herein by reference.

Whether or not the input biometric multi-touch matches the samples of the stored template may be determined as follows. The inventors investigated two decision rules which are suitable for different applications and require different training sets; (1) a variant of the k-NN based rule, and (2) a score based rule, each described below.

In a variant of the k-NN based rule, the weight of each of k nearest instances is assigned as the inverse function of its distance to a test instance. Let dj be the distance from a test instance to its $j^{th}$ nearest neighbor among k nearest ones, the weight wj is given by Kim, D., Dunphy, P., Briggs, P., Hook, J., Nicholson, J., Nicholson, J., and Olivier, P., "Multi-Touch Authentication on Tabletops," *Proceedings of the 28th International Conference on Human Factors in Computing Systems*, CHI '10, pp. 1093-1102 (ACM, New York, N.Y., USA, 2010), as:

$$w_j = \frac{d_k - d_j}{d_k - d_1}$$

In the verification case, the voting score is normalized in order to cope with the differences between intra-user variations. To achieve that, the total weight of all nearest neighbors are normalized to 1. The normalized weight $w_j'$ is defined as follows:

$$w_j' = \frac{w_j}{\sum_{i=1}^{k} w_i}$$

The verification score is then the sum of all weights of the neighbors belonging to the subject.

The major disadvantage of the k-NN rule is that it is only used to classify a sample from a known class. That is, training the classifier requires samples from all classes. Practically, in some scenarios, it is not possible to have complete control over the input. In other words, the input might be from an unknown user. In this case, the performance of k-NN is unpredictable.

For the situation where only positive samples (from an enrolled user) are known to the system, a score can only be computed based on these samples. In this case, the system computes the score using a min rule given by:

$$\text{Score}(G, T^*) = \min_i(D(T_i^*, G))$$

where Score (G, T*) is the distance from the input sample G to the set of training samples T*, $T_i^*$ is $i^{th}$ training sample, and D ($T_i^*$, G) is the curve distance between $T_i^*$ to G.

§5.3 User Study

Details of a user study conducted using an example system consistent with the present invention are described in the paper, Napa Sae-Bae, Kowsar Ahmed, Katherine Isbister, Nasir Memon, "Biometric-Rich Gestures: A Novel Approach to Authentication on Multi-Touch Devices," CHI '12: *Proceedings of the SIGCHI Conference on Human Factors in Computing Systems*, pages 977-986 (May 2012, ACM New York, N.Y.), incorporated herein by reference. All 29 participants of the study thought that gestures would be faster than text passwords, 25 out of 29 participants said they would prefer this method, 26 out of 28 participants said that it would be easy to memorize, and 27 out of 29 participants said that it would get even easier with practice. User comments about why they would prefer this method included: "No typing and easy to perform," "It is faster, simpler and cooler" and "I have too many passwords to memorize." People who preferred text passwords reported that this was because they were used to the method.

A system performance of 10% EER (Equal Error Rate) on average for single gestures, and 5% EER on average for double gestures was found. User preferences seemed to have a linear relationship to system performance (which is not the case for text-based password schemes). Users rated the method highly and seemed very open to adopting it for everyday use. It is interesting to note from the data, that the one gesture which created a strong self-report of excitement, was performing a "user defined" gesture (participants pretended to sign their signature on the screen with all five fingers). The inventors believe that one potential reason for this excitement was the opportunity to make use of something highly personal.

§5.4 Example Apparatus

Figure 9:
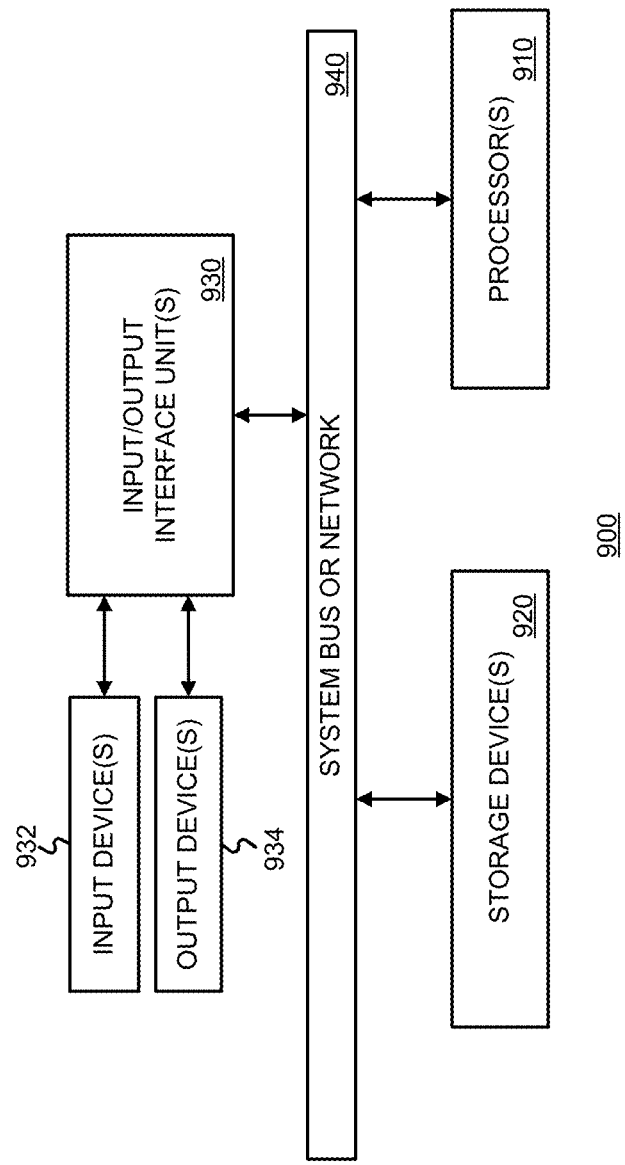
FIG. 9 illustrates an example apparatus consistent with the present invention.

FIG. 9 is a block diagram of exemplary apparatus 900 that may be used to perform operations of various components in a manner consistent with the present invention and/or to store information in a manner consistent with the present invention. The apparatus 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., running on the Android operating system from Google, Inc., the Bada operating system from Samsung Electronics, the Blackberry operating system from RIM, the iOS operating system from Apple, Inc., the Symbian operating system from Nokia, the Windows Phone operating system from Microsoft, the Linux operating system widely available from a number of vendors such as Red Hat, Inc. of Durham, N.C., etc.) to perform one or more aspects of the present invention. For example, one or more software modules (or components), when executed by a processor, may be used to perform one or more of the methods of FIGS. 3 and 5-7. At least a portion of the machine executable instructions may be stored (temporarily or more permanently) on the one or more storage devices 920 and/or may be received from an external source via one or more input interface units 930.

In one embodiment, the machine 900 may be one or more conventional smart phones or tablets with multi-touch display screens. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, and/or solid state memory.

A user may enter commands and information into the device 900 through input devices 932, such as a multi-touch display screen for example. Other input devices may also be included. These and other input devices are often connected to the processing unit(s) 910 through an appropriate interface 930 coupled to the system bus 940. The output devices 934 may include a monitor or. other type of display device, which may also be connected to the system bus 940 via an appropriate interface. In addition to (or instead of) the monitor, the personal computer may include other (peripheral) output devices (not shown), such as speakers for example.

The operations of components, such as those described above, may be performed on one or more computers. Such computers may communicate with each other via one or more networks, such as the Internet for example.

Alternatively, or in addition, the various operations and acts described above may be implemented in hardware (e.g., integrated circuits, application specific integrated circuits (ASICs), field programmable gate or logic arrays (FPGAs), etc.).

Figure 10:
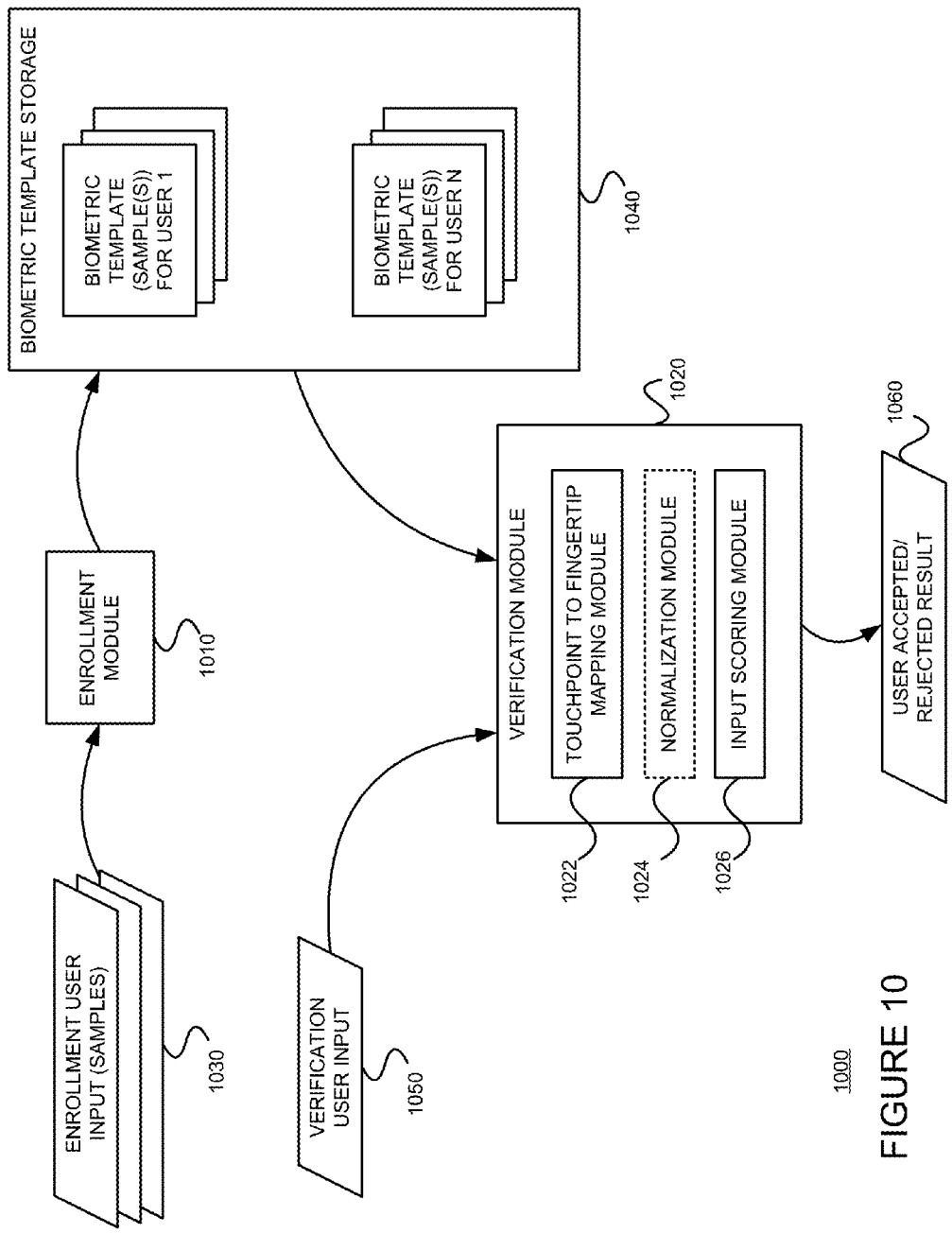
FIG. 10 illustrates an example apparatus consistent with the present invention.

FIG. 10 is a block diagram of exemplary apparatus 1000 that may be used to perform operations of various components in a manner consistent with the present invention and/or to store information in a manner consistent with the present invention. The apparatus 1000 includes an enrollment module 1010 and a verification module 1020. The verification module 1020 includes a touch point to fingertip mapping module 1022, a normalization module (if needed) 1024 and an input scoring module 1024. The modules may be hardware modules and/or software modules.

As shown, the enrollment module 1010 receives enrollment user multi-touch input (samples) 1030 and stores biometric templates for one or more users in storage 1040. The verification module 1020 receives a verification multi-touch user input 1050 and, using a stored biometric template for a given user, determines whether or not the user is accepted or rejected 1060 based on the similarity (or dissimilarity) of the input 1050 to the samples of the stored template for the given user. The modules 1022, 1024 and 1026 of the verification module 1020 may perform the various methods described above with reference to FIGS. 3-7.

§5.5 Refinements, Extensions and Alternatives

Accuracy may be improved by implementing a translation factor optimization to minimize gesture distance. In addition, obtaining more touch attributes, such as pressure or touch surface area, should permit further accuracy improvements.

The example methods described above may be combined with other biometric information, such as face recognition using a device's on-board camera.

Although some example methods and gestures use five finger multi-touch gestures, more or less touch points may be used in other embodiments consistent with the present invention.

§5.6 Conclusions

As can be appreciated from the foregoing, at least some example embodiments consistent with the present invention provide user verification which is less susceptible to shoulder surfing or finger oil attacks, while providing significantly large entropy, in a manner enjoyable to users.

What is claimed is:

1. A computer-implemented method comprising:
   a) obtaining, by a computer system including one or more processors, a multi-touch input sequence including
      1) determining, at a plurality of time instances, a mapping from an unordered set of at least four touch points to an ordered set of at least four fingertips, wherein for at least one of the plurality of time instances, the mapping from the unordered set of at least four touch points to the ordered set of at least four fingertips is subject to a constraint that the ordered set of at least four touch points defines a simple polygon; and
   b) controlling, by the computer system, access to a device, service, or information, using the obtained multi-touch input sequence.

2. The computer-implemented method of claim 1 wherein the mapping from an unordered set of at least four touch points to an ordered set of at least four fingertips at a first of the plurality of time instances includes
   (A) determining a centroid of the at least four touch points,
   (B) ordering the at least four touch points based on an angle each of the at least four touch points makes with the determined centroid,
   (C) mapping a touch point furthest away from its neighbors as the thumb, and
   (D) mapping remaining touch points following their coordinates in a circular arc from the thumb.

3. The computer-implemented method of claim 1 wherein the act of determining, at a plurality of time instances, a mapping from an unordered set of at least four touch points to an ordered set of at least four fingertips, wherein for at least one of the plurality of time instances, the mapping from the unordered set of at least four touch points to the ordered set of at least four fingertips is subject to a constraint that the ordered set of at least four touch points defines a simple polygon includes
   (A) for each of the plurality of time instances following a first of the plurality of time instances, searching for a current mapping function such that a sum of Euclidean distances between corresponding fingertips from a previously assigned sequence of fingertips is minimized, and such that the sequence of fingertips defines a simple polygon.

4. The computer-implemented method of claim 1 wherein the act of determining, at a plurality of time instances, a mapping from an ordered set of at least four touch points to an ordered set of at least four fingertips, wherein for at least one of the plurality of time instances, the mapping from the ordered set of at least four touch points to the ordered set of at least four fingertips is subject to a constraint that the ordered set of at least four touch points defines a simple polygon includes
   (A) for each of the plurality of time instances following a first of the plurality of time instances, determining a largest convex hull containing each of the at least four touch points,
   (B) determining whether or not the convex hull passes through each of the at least four touch points,
   (C) responsive to a determination that the convex hull passes through each of the at least four touch points, mapping the set of at least four touch points, as currently ordered, to an ordered set of at least four fingertips, and otherwise, responsive to a determination that the convex hull does not pass through each of the at least four touch points, reordering the at least four touch points and repeating acts (a) (1) (B) and (a)(1)(C).

5. The computer-implemented method of claim 1 wherein the act of obtaining a multi-touch input sequence, at a plurality of time instances, the determined mapping from an ordered set of at least four touch points to an ordered set of at least four fingertips includes normalizing.

6. The computer-implemented method of claim 5 wherein the act of normalizing includes (i) setting a touch point of the thumb to the origin of an x-y coordinate system, and (ii) setting the first index finger on the x-axis of the x-y coordinate system.

7. The computer-implemented method of claim 5 wherein the act of normalizing includes providing location invariance and rotation invariance.

8. The computer-implemented method of claim 7 wherein the act or normalizing further includes providing length invariance.

9. A computer-implemented method comprising:
a) obtaining, by a computer system including one or more processors, a multi-touch input sequence including determining, at a plurality of time instances, a mapping from an ordered set of at least four touch points to a an ordered set of at least four fingertips, wherein for at least one of the plurality of time instances, the mapping from the ordered set of at least four touch points to the ordered set of at least four fingertips is subject to a constraint that the ordered set of at least four touch points defines a simple polygon; and
b) defining, by the computer system, a template of the user's multi-touch input sequence obtained; and
c) storing, by the computer system, the template.

10. The computer-implemented method of claim 9 further comprising:
d) receiving, by the computer system, a verification multi-touch input sequence;
e) comparing, by the computer system, the received verification multi-touch input sequence with the stored template; and
f) permitting or denying, by the computer system, access to a device, service, or information based on a result of the comparison.

11. Apparatus comprising:
a) at least one input;
b) at least one processor; and
c) at least one storage device storing processor-executable instructions which, when executed by the at least one processor, perform a method of:
1) obtaining a multi-touch input sequence,
2) determining, at a plurality of time instances, a mapping from an unordered set of at least four touch points to an ordered set of at least four fingertips, wherein for at least one of the plurality of time instances, the mapping from the unordered set of at least four touch points to the ordered set of at least four fingertips is subject to a constraint that the ordered set of at least four touch points defines a simple polygon, and
3) controlling access to a device, service, or information, using the obtained multi-touch input sequence.

12. The apparatus of claim 11 wherein the mapping from an unordered set of at least four touch points to an ordered set of at least four fingertips at a first of the plurality of time instances includes
(A) determining a centroid of the at least four touch points,
(B) ordering the at least four touch points based on an angle each of the at least four touch points makes with the determined centroid,
(C) mapping a touch point furthest away from its neighbors as the thumb, and
(D) mapping remaining touch points following their coordinates in a circular arc from the thumb.

13. The apparatus of claim 11 wherein the act of determining, at a plurality of time instances, a mapping from an unordered set of at least four touch points to an ordered set of at least four fingertips, wherein for at least one of the plurality of time instances, the mapping from the unordered set of at least four touch points to the ordered set of at least four fingertips is subject to a constraint that the ordered set of at least four touch points defines a simple polygon includes
(A) for each of the plurality of time instances following a first of the plurality of time instances, searching for a current mapping function such that a sum of Euclidean distances between corresponding fingertips from a previously assigned sequence of fingertips is minimized, and such that the sequence of fingertips defines a simple polygon.

14. The apparatus of claim 11 wherein the act of determining, at a plurality of time instances, a mapping from an ordered set of at least four touch points to an ordered set of at least four fingertips, wherein for at least one of the plurality of time instances, the mapping from the ordered set of at least four touch points to the ordered set of at least four fingertips is subject to a constraint that the ordered set of at least four touch points defines a simple polygon includes
(A) for each of the plurality of time instances following a first of the plurality of time instances, determining a largest convex hull containing each of the at least four touch points,
(B) determining whether or not the convex hull passes through each of the at least four touch points,
(C) responsive to a determination that the convex hull passes through each of the at least four touch points, mapping the set of at least four touch points, as currently ordered, to an ordered set of at least four fingertips, and otherwise, responsive to a determination that the convex hull does not pass through each of the at least four touch points, reordering the at least four touch points and repeating acts (a)(1)(B) and (a)(1)(C).

15. The apparatus of claim 11 wherein the act of obtaining a multi-touch input sequence, at a plurality of time instances, the determined mapping from an ordered set of at least four touch points to an ordered set of at least four fingertips includes normalizing.

16. The apparatus of claim 15 wherein the act of normalizing includes (i) setting a touch point of the thumb to the origin of an x-y coordinate system, and (ii) setting the first index finger on the x-axis of the x-y coordinate system.

17. The apparatus of claim 15 wherein the act of normalizing includes providing location invariance and rotation invariance.

18. The apparatus of claim 17 wherein the act or normalizing further includes providing length invariance.

* * * * *